United States Patent
Bil et al.

(10) Patent No.: US 8,800,291 B2
(45) Date of Patent: Aug. 12, 2014

(54) BLEEDING OF AIR VIA THE DIFFUSER OF A CENTRIFUGAL COMPRESSOR OF A TURBINE ENGINE

(75) Inventors: Eric Stephan Bil, Chartrettes (FR); Jean-Francois Rios, Nandy (FR); Delphine Roussin-Leroux, Samois sur Seine (FR)

(73) Assignee: SNECMA, Paris (FR)

( * ) Notice: Subject to any disclaimer, the term of this patent is extended or adjusted under 35 U.S.C. 154(b) by 551 days.

(21) Appl. No.: 13/165,016

(22) Filed: Jun. 21, 2011

(65) Prior Publication Data
US 2011/0314828 A1 Dec. 29, 2011

(30) Foreign Application Priority Data

Jun. 24, 2010 (FR) ...................................... 10 55070

(51) Int. Cl.
*F01D 1/06* (2006.01)
*F02C 1/00* (2006.01)

(52) U.S. Cl.
USPC .......................................... 60/751; 415/224.5

(58) Field of Classification Search
CPC ..... F23R 3/04; F04D 29/542; F04D 27/0207; F04D 27/0215; F04D 29/444; F02C 6/08; F02C 9/18
USPC ......... 60/751, 782, 785, 795; 415/224.5, 207, 415/208.4, 208.3, 208.5, 211.1, 211.2
See application file for complete search history.

(56) References Cited

U.S. PATENT DOCUMENTS

| | | | | |
|---|---|---|---|---|
| 3,285,006 | A | * | 11/1966 | Freeman et al. ................ 60/804 |
| 5,555,721 | A | * | 9/1996 | Bourneuf et al. ............... 60/806 |
| 6,279,322 | B1 | | 8/2001 | Moussa |
| 6,280,139 | B1 | * | 8/2001 | Romani et al. ................ 415/207 |
| 2008/0056892 | A1 | | 3/2008 | Barton et al. |

FOREIGN PATENT DOCUMENTS

| | | |
|---|---|---|
| GB | 2 060 074 A | 4/1981 |
| WO | WO 01/18404 A1 | 3/2001 |
| WO | WO 01/29424 A1 | 4/2001 |

OTHER PUBLICATIONS

French Preliminary Search Report issued Mar. 14, 2011, in French 1055070, filed Jun. 24, 2010 (with English Translation of Category of Cited Documents).

* cited by examiner

*Primary Examiner* — Gerald L Sung
(74) *Attorney, Agent, or Firm* — Oblon, Spivak, McClelland, Maier & Neustadt, L.L.P.

(57) ABSTRACT

A diffuser which straightens the flow of air issuing from a centrifugal compressor in a turbine engine is provided. The diffuser having a cylindrical shape and including a first part having the form of two substantially parallel discs extending substantially radially relative to the axis of symmetry of the diffuser, a second bent part, and a third part intended to open out into a downstream cavity, positioned downstream of the diffuser and fed with air issuing from the compressor. The first part is traversed by a plurality of channels distributed evenly over its circumference and opening out on its downstream face so as to bring the air contained in the downstream cavity into communication with a bleed cavity situated upstream of the diffuser.

16 Claims, 2 Drawing Sheets

BLEEDING OF AIR VIA THE DIFFUSER OF A CENTRIFUGAL COMPRESSOR OF A TURBINE ENGINE

BACKGROUND OF THE INVENTION

1. Field of the Invention

The field of the present invention is that of turbine engines and, more particularly, that of devices associated with the bleeding of air which is effected on these turbine engines.

2. Description of the Related Art

The main purpose of turbine engines is to produce thrust or supply power to a vehicle, such as an aircraft, but they also often have the additional function of supplying pressurized air in order to carry out a number of auxiliary functions which are necessary for the satisfactory operation of this vehicle. Two main types of auxiliary function are known, one in which power is drawn off from a shaft driven by the driveshaft of the turbine engine and one in which air is bled at the outlet of one of the stages of the compressors of the turbine engine. This pressurized air can be used, for example, for the air conditioning of the cabin, for pressurizing the fuel tanks and for other functions, these functions being together known by the name ECS (Environmental Control System).

The air is generally bled from a cavity situated downstream of the last compressor where the flow is tranquilized before it exits the turbine engine. It is then conveyed, via a bleed pipe, to the various elements of the aircraft which make use of it.

In turbine engines where the last stage takes the form of a centrifugal compressor, the flow is straightened by a diffuser in order to direct it substantially in the axis of the combustion chamber. A diffuser is a cylindrical part which collects the air as it exits the turbine wheel of the centrifugal compressor and which straightens it so as to direct it in a substantially axial direction.

When air is bled as it exits the last compression stage, the tranquilization chamber is generally situated upstream of the centrifugal compressor so as to make optimum use of the space. The flow of air which has been bled then needs to pass through the radial barrier formed by the wheel of the diffuser. Devices for bleeding air at the diffuser have been conceived, in the form of a tapping point situated either on the upstream face of the diffuser, or at its radial end, such that the air which has been bled does not have to pass through the wheel of the diffuser. But this solution has the major disadvantage that it does not separate the air from the dust which it conveys and that this dust is present in the tranquilization chamber and is carried into the pressurization circuit of the aircraft. Another solution was then conceived, which consists in bleeding the ECS conditioning air downstream of the diffuser, from the inlet cavity of the combustion chamber, and in passing it through a particular circuit so as to forward it to the tranquilization chamber. This solution, which generally consists in bypassing the diffuser on the outside, entails an increase in the weight of the turbine engine.

BRIEF SUMMARY OF THE INVENTION

The object of the present invention is to overcome these disadvantages by providing a routing of the air between the outlet of the diffuser and the tranquilization chamber which is simple both aerodynamically and energetically, and which is not prone to carrying the pollution which can circulate in the air stream. The purpose of this movement is in particular to bleed depolluted air and to return it with the maximum degree of tranquilization.

To this end, the subject of the invention is a diffuser intended to straighten the flow of air issuing from a centrifugal compressor in a turbine engine, the said diffuser having a cylindrical shape and comprising a first part having the form of two substantially parallel discs extending substantially radially relative to the axis of symmetry of the diffuser, a second bent part and a third part intended to open out into a downstream cavity, positioned downstream of the said diffuser and fed with air issuing from the said compressor. It is characterized in that the first part is traversed by a plurality of channels distributed evenly over its circumference and opening out on its downstream face so as to bring the air contained in the said downstream cavity into communication with a bleed cavity situated upstream of the said diffuser.

The passage of the air through the diffuser prevents the need to bypass it, which reduces the length and weight of the pipes which would be needed. Moreover, the multiplicity of the channels and their even distribution over the circumference of the diffuser makes it possible to improve the tranquilization of the air in the bleed cavity. Lastly, bleeding the air in the first part of the diffuser guarantees that it is bled in a depolluted zone, any dust having been centrifuged to the outside of the turbine engine.

The first part preferably comprises at least a plurality of straighteners forming means for channelling the flow of air circulating between the two disks in which the said channels are integrated, such that they do not interfere with the flow of air.

The use of the straighteners of the diffuser to cause the flow of air to pass through it constitutes a simple and aerodynamically effective solution.

Each straightener is advantageously traversed by a channel.

In a particular embodiment, the said straighteners take the form of a blade with a suction side and pressure side extending between the two discs in substantially radial planes and the said channels extend between the said suction side and pressure side in a substantially axial orientation.

The subject of the invention is also a turbine engine comprising at least one compression stage consisting of a centrifugal compressor, a bleed cavity situated upstream of the said centrifugal compressor and intended to be fed via a downstream cavity with air issuing from the said centrifugal compressor, the said downstream cavity being positioned downstream of the said compressor, characterized in that it has a diffuser as described above which is positioned at the outlet of the said compressor in order to straighten the flow of air from the said turbine engine and feed the said downstream cavity and which brings the air contained in the downstream cavity into communication with the bleed cavity via its channel.

The said downstream cavity is preferably the chamber inlet cavity of the turbine engine.

Still more preferably, the centrifugal compressor constitutes the last compression stage of the said turbine engine.

BRIEF DESCRIPTION OF THE SEVERAL VIEWS OF THE DRAWINGS

The invention will be better understood and other objects, details, features and advantages of it will become more apparent from the following detailed explanatory description of an embodiment of the invention which is given purely by way of illustration and with no limitation being implied, made with reference to the attached diagrammatic drawings, in which.

DETAILED DESCRIPTION OF THE INVENTION

Figure 1:
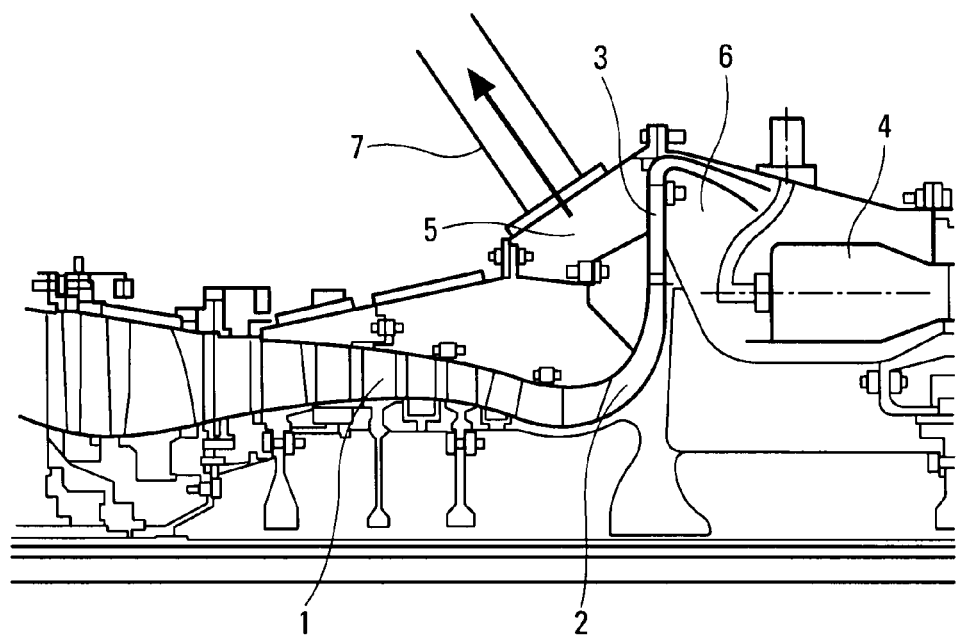
FIG. 1 is a view in cross-section of the central part of a turbine engine in which the last compression stage is a centrifugal compressor.

With reference to FIG. 1, the central part of a turbine engine can be seen in longitudinal cross-section, comprising a high-pressure compressor 1 followed downstream by a centrifugal compressor 2, then a diffuser 3 which straightens the air stream downstream from the centrifugal compressor 2 and lastly a combustion chamber 4. A bleed cavity 5 forming a tranquilization chamber from which the air fed to the ECS system is bled is arranged upstream of the diffuser 3. Branching off from this cavity is a bleed pipe 7 which conveys the bled air to this ECS system. On the other side of the diffuser 3 is situated the chamber inlet cavity 6, in which the compressed air arrives when it exits the diffuser 3.

Figure 2:
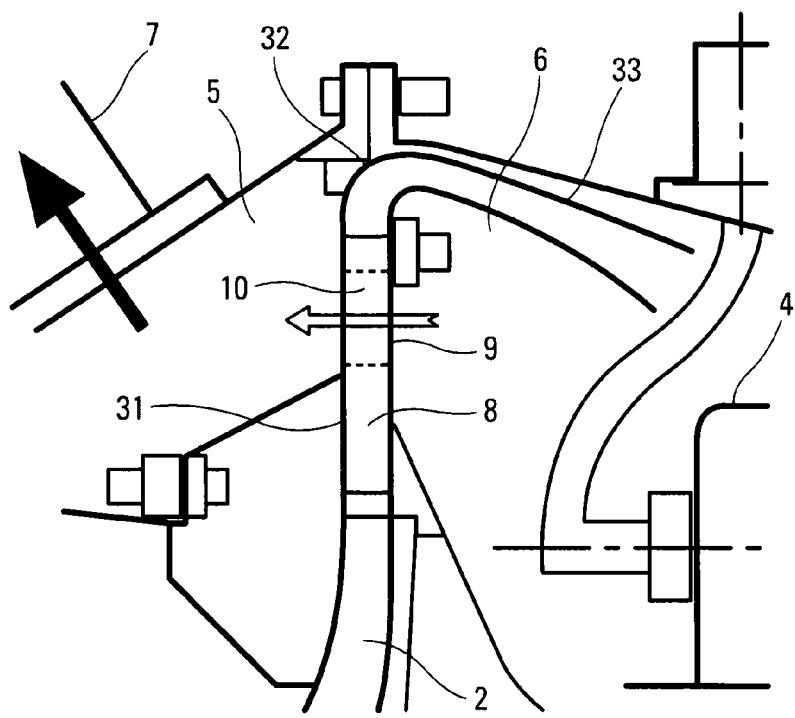
FIG. 2 is a view of a detail from FIG. 1.

With reference now to FIG. 2, the diffuser 3 has a cylindrical shape having a first part 31 forming a double disc extending radially, into which the air flows when it exits the centrifugal compressor 2, and which is extended at its radial end by a second bent part 32 which restores the flow substantially into the axial direction of the engine. The diffuser 3 is continued, downstream from the bend 32, by a third part 33 forming a double ring flared slightly at its longitudinal end. In a known manner, the first part 31 carries, between its two discs, straighteners 8 in the form of walls extending between the two faces of the disc, in substantially radial planes, and the purpose of which is to counter any circumferential rotation of the flow of compressed air. These straighteners, which are placed substantially at the bed of the flow, take the form of aerodynamic blades with a leading edge situated on the side of the outlet from the centrifugal compressor and a trailing edge situated immediately upstream of the bend 32.

Figure 3:
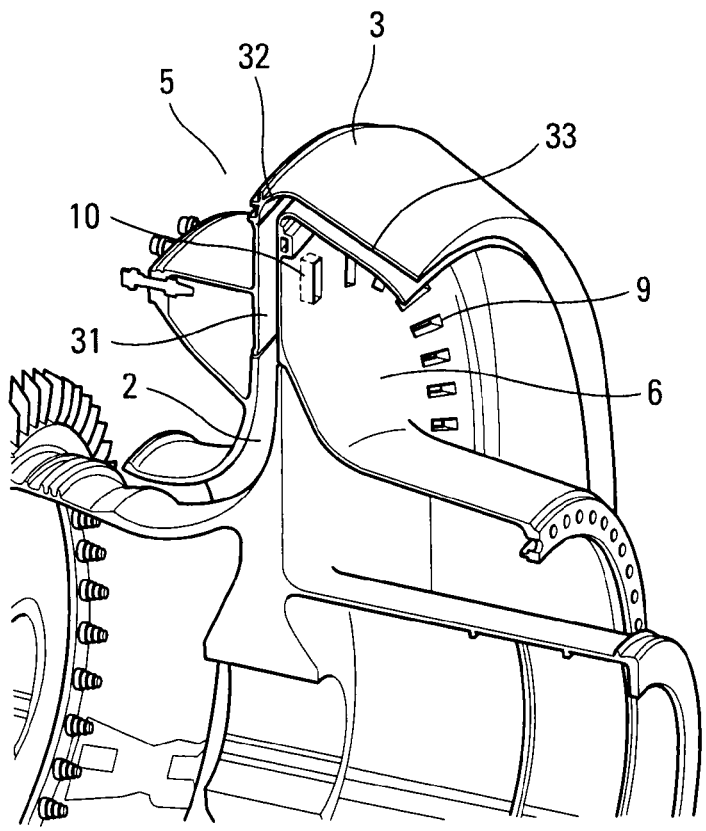
FIG. 3 is a perspective view in cross-section, in its immediate environment, of the diffuser of the turbine engine in FIG. 1.
Figure 4:
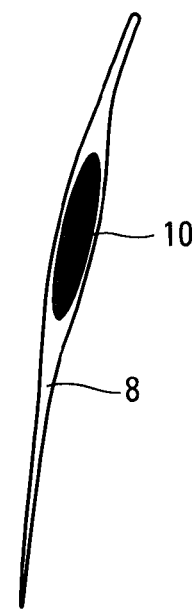
FIG. 4 is a view in cross-section of a straightener according to an embodiment of the invention, positioned in the diffuser in FIG. 3.

FIG. 3 shows the diffuser 3 in perspective with a series of openings 9 made in each of the discs of its first part 31; these openings are arranged regularly over the face of the discs and arranged opposite the straighteners 8. As can be seen in FIG. 4, the latter are hollow and are traversed by a channel 10 which joins the upstream cavity 6 to the cavity 5 for bleeding air. So that the channels 10 can be aligned with the cavities which they bring into communication with each other, they are positioned on the trailing-edge side of the blade forming the straightener 8, the cavities generally being positioned on the outer side of the engine. They are oriented in the axial direction of the engine so as to be perpendicular to the discs forming the first part 31 of the diffuser 3.

Figure 5:
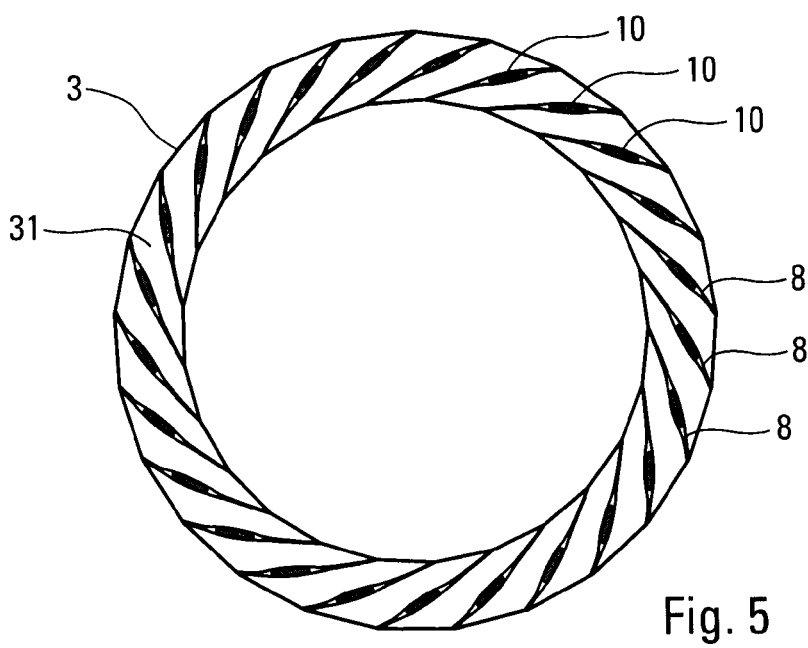
FIG. 5 shows a view in cross-section of a diffuser having straighteners according to FIG. 4.

FIG. 5 shows the distribution of the straighteners 8 in the first part 31 of the diffuser 3, in a radial cross-section made through this first part. The straighteners 8 according to the invention have a thickened portion at their centre owing to the establishment of a through channel 10. However, only a negligible impact has been noted on the circulation of the air in the diffuser.

The route followed by the air used to feed the ECS system of the aircraft will now be described, when the air is bled from a turbine engine having a diffuser according to the invention.

The air exiting the centrifugal compressor 2 enters the diffuser 3 following the route defined by the straighteners 8 placed between the two discs of the first part 31. It is straightened by the bend 32 and emerges in a substantially axial direction through the third part 33 into the chamber inlet cavity 6. In so doing, any pollution which it transports is ejected in an axial direction when it exits the third part 33 and does not remain in the chamber inlet cavity 6. Whilst most of the air issuing from the diffuser 3 passes into the combustion chamber 4, an unpolluted quantity of this air traverses the diffuser by passing through the holes 9 and the channels 10 made in the thickened portion of the blades of the straighteners 8. It is then situated in the bleed cavity 5, where it is tranquilized and harmonizes its pressure before exiting the engine through the bleed pipe 7, towards the ECS circuit of the aircraft.

Pollution can be removed, in the loop route so formed, by bleeding the air at a position situated radially at the mid-height of the engine, where it is not possible to site solid elements. The routing is, moreover, effected in an extremely simple fashion as it does not require special devices for bypassing the diffuser 3, thus avoiding the presence of specific pipes which would have a detrimental effect on the radial bulk of the engine and/or on the overall weight of the engine.

The present invention has been described with a centrifugal compressor 2 constituting the last compression stage and a diffuser 3 which opens out into the chamber inlet cavity 6. It could equally well be implemented on a turbine engine having a centrifugal compressor situated further upstream, for example at the outlet of a low-pressure compressor, and similarly the air could be bled from the air stream downstream of this centrifugal compressor, and the bleed cavity could be positioned upstream of this same compressor.

The invention claimed is:

1. A diffuser intended to straighten a flow of air issuing from a centrifugal compressor in a turbine engine, the diffuser having a cylindrical shape and comprising:
   a first part having a form of two substantially parallel discs extending substantially radially relative to an axis of symmetry of the diffuser;
   a second bent part; and
   a third part intended to open out into a downstream cavity, positioned downstream of the diffuser and fed with air issuing from the compressor,
   wherein the first part is traversed by a plurality of channels distributed evenly over a circumference thereof and opening out on a downstream face thereof so as to bring the air contained in the downstream cavity into communication with a bleed cavity situated upstream of the diffuser.

2. The diffuser according to claim 1, wherein the first part comprises a plurality of straighteners which channels a flow of air circulating between the two discs and the channels are integrated, such that the channels do not interfere with the flow of air.

3. The diffuser according to claim 2, wherein each straightener is traversed by a channel.

4. The diffuser according to claim 3, wherein the straighteners take a form of a blade with a suction side and pressure side extending between the two discs in substantially radial planes and the channels extend between the suction side and pressure side in a substantially axial orientation.

5. A turbine engine comprising:
   at least one compression stage including a centrifugal compressor, a bleed cavity situated upstream of the centrifugal compressor and intended to be fed via a downstream cavity with air issuing from the centrifugal compressor, the downstream cavity being positioned downstream of the compressor; and a diffuser according to claim 1 which is positioned at an outlet of the compressor in order to straighten a flow of air from the turbine engine and feed the downstream cavity and which brings air contained in the downstream cavity into communication with the bleed cavity via a channel.

6. The turbine engine according to claim 5, wherein the downstream cavity is a chamber inlet cavity of the turbine engine.

7. The turbine engine according to claim 6, wherein the centrifugal compressor constitutes a last compression stage of the turbine engine.

8. A turbine engine comprising:

at least one compression stage including a centrifugal compressor, a bleed cavity situated upstream of the centrifugal compressor and intended to be fed via a downstream cavity with air issuing from the centrifugal compressor, the downstream cavity being positioned downstream of the compressor; and a diffuser according to claim 2 which is positioned at an outlet of the compressor in order to straighten a flow of air from the turbine engine and feed the downstream cavity and which brings air contained in the downstream cavity into communication with the bleed cavity via a channel.

9. The turbine engine according to claim 8, wherein the downstream cavity is a chamber inlet cavity of the turbine engine.

10. The turbine engine according to claim 9, wherein the centrifugal compressor constitutes a last compression stage of the turbine engine.

11. A turbine engine comprising:

at least one compression stage including a centrifugal compressor, a bleed cavity situated upstream of the centrifugal compressor and intended to be fed via a downstream cavity with air issuing from the centrifugal compressor, the downstream cavity being positioned downstream of the compressor; and a diffuser according to claim 3 which is positioned at an outlet of the compressor in order to straighten a flow of air from the turbine engine and feed the downstream cavity and which brings air contained in the downstream cavity into communication with the bleed cavity via a channel.

12. The turbine engine according to claim 11, wherein the downstream cavity is a chamber inlet cavity of the turbine engine.

13. The turbine engine according to claim 12, wherein the centrifugal compressor constitutes a last compression stage of the turbine engine.

14. A turbine engine comprising:

at least one compression stage including a centrifugal compressor, a bleed cavity situated upstream of the centrifugal compressor and intended to be fed via a downstream cavity with air issuing from the centrifugal compressor, the downstream cavity being positioned downstream of the compressor; and a diffuser according to claim 4 which is positioned at an outlet of the compressor in order to straighten a flow of air from the turbine engine and feed the downstream cavity and which brings air contained in the downstream cavity into communication with the bleed cavity via a channel.

15. The turbine engine according to claim 14, wherein the downstream cavity is a chamber inlet cavity of the turbine engine.

16. The turbine engine according to claim 15, wherein the centrifugal compressor constitutes a last compression stage of the turbine engine.

\* \* \* \* \*